(12) United States Patent
Lin et al.

(10) Patent No.: US 9,734,427 B2
(45) Date of Patent: Aug. 15, 2017

(54) SURVEILLANCE SYSTEMS AND IMAGE PROCESSING METHODS THEREOF

(71) Applicant: Industrial Technology Research Institute, Hsinchu (TW)

(72) Inventors: Che-Tsung Lin, Hsinchu (TW); Yu-Chen Lin, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 351 days.

(21) Appl. No.: 14/586,715

(22) Filed: Dec. 30, 2014

(65) Prior Publication Data

US 2016/0142644 A1 May 19, 2016

(30) Foreign Application Priority Data

Nov. 17, 2014 (TW) .............................. 103139705 A

(51) Int. Cl.
| | |
|---|---|
| *H04N 5/265* | (2006.01) |
| *G06K 9/62* | (2006.01) |
| *G06K 9/52* | (2006.01) |
| *H04N 7/18* | (2006.01) |
| *H04N 5/232* | (2006.01) |
| *H04N 5/247* | (2006.01) |
| *G06T 3/40* | (2006.01) |

(52) U.S. Cl.
CPC ............. *G06K 9/6202* (2013.01); *G06K 9/52* (2013.01); *G06T 3/4038* (2013.01); *H04N 5/23238* (2013.01); *H04N 5/247* (2013.01); *H04N 7/181* (2013.01)

(58) Field of Classification Search
CPC .... H04N 5/23238; H04N 5/247; H04N 7/181; G06T 3/4038; G06K 9/6202; G06K 9/52
USPC .......................................................... 348/143
See application file for complete search history.

(56) References Cited

U.S. PATENT DOCUMENTS

| | | | |
|---|---|---|---|
| 8,587,661 B2 | 11/2013 | McCubbrey | |
| 2005/0270371 A1* | 12/2005 | Sablak | ...................... G06T 3/00 348/143 |
| 2009/0073265 A1 | 3/2009 | Greenhill et al. | |
| 2009/0256908 A1* | 10/2009 | Chen | ..................... H04N 7/181 348/143 |

(Continued)

FOREIGN PATENT DOCUMENTS

| | | |
|---|---|---|
| CN | 101621634 | 1/2010 |
| CN | 101950426 | 1/2011 |

(Continued)

OTHER PUBLICATIONS

Taiwan Patent Office, Office Action, Patent Application Serial No. 103139705, Nov. 18, 2015, Taiwan.

(Continued)

*Primary Examiner* — Nguyen Truong

(57) ABSTRACT

Surveillance systems with a plurality of cameras and image processing method thereof are provided. Based on a plurality of images captured by the plurality of cameras, some of the images are translucentized with other images and the other images are stitched with each other according to the space geometrical relations of cameras. The benefit of the surveillance system is that monitoring the field surveilled by each camera is no longer necessary to watch each image separately.

12 Claims, 9 Drawing Sheets

(56) References Cited

U.S. PATENT DOCUMENTS

| | | | |
|---|---|---|---|
| 2009/0262206 A1* | 10/2009 | Park | G08B 13/19641 348/218.1 |
| 2009/0278857 A1 | 11/2009 | Wajs | |
| 2012/0113261 A1* | 5/2012 | Satoh | B60R 1/00 348/148 |
| 2012/0169842 A1 | 7/2012 | Chuang et al. | |
| 2012/0274814 A1 | 11/2012 | Wajs | |
| 2013/0135468 A1* | 5/2013 | Kim | G06K 9/00771 348/143 |
| 2014/0111607 A1 | 4/2014 | Scherling | |

FOREIGN PATENT DOCUMENTS

| | | |
|---|---|---|
| CN | 102065313 | 5/2011 |
| CN | 102474596 A | 5/2012 |
| CN | 103442221 A | 12/2013 |
| TW | 497366 B | 8/2002 |
| TW | 200943963 | 10/2009 |
| TW | 201111902 | 4/2011 |
| TW | 201120807 | 6/2011 |
| TW | 201222475 A1 | 6/2012 |
| TW | 201415414 A | 4/2014 |

OTHER PUBLICATIONS

Joon Shik Yoon et al., "Regularized Image Sequence Interpolation by Fusing Low-Resolution Frames," TENCON 99. Proceedings of the IEEE Region 10 Conference, Dec. 1999, pp. 1271-1274, vol. 2, IEEE, US.

Shutao Li et al., "Fusing Images with Different Focuses Using Support Vector Machines," Neural Networks, IEEE Transactions on, Nov. 2004, 8 pages, vol. 15, issue 6, IEEE, US.

Wei Wang et al., "A Variational Method for Multiple-Image Blending," IEEE Transactions on Image Processing, Apr. 2012, pp. 1809-1822, vol. 21, No. 4, IEEE, US.

Cedric Allene et al., "Seamless Image-Based Texture Atlases Using Multi-Band Blending," Pattern Recognition, 2008. ICPR 2008. 19th International Conference on, Dec. 2008, pp. 1-4, IEEE, US.

Yingen Xiong et al., "Sequential Image Stitching for Mobile Panoramas," Information, Communications and Signal Processing, 2009. ICICS 2009. 7th International Conference on, Dec. 2009, pp. 1-5, IEEE, US.

Hiroyuki Uchiyama et al., "Removal of Moving Objects from a Street-view Image by Fusing Multiple Image Sequences," 2010 International Conference on Pattern Recognition, Aug. 2010, pp. 3456-3459, IEEE, US.

David Nister, "An Efficient Solution to the Five-Point Relative Pose Problem," IEEE Transactions on Pattern Analysis and Machine Intelligence, Jun. 2004, pp. 756-770, vol. 26, No. 6, IEEE, US.

Richard I. Hartley, "In Defense of the Eight-Point Algorithm," IEEE Transactions on Pattern Analysis and Machine Intelligence, Jun. 1997, pp. 580-593, vol. 19, No. 6, IEEE, US.

\* cited by examiner

SURVEILLANCE SYSTEMS AND IMAGE PROCESSING METHODS THEREOF

CROSS REFERENCE TO RELATED APPLICATIONS

This Application claims priority of Taiwan Application No. 103139705, filed on Nov. 17, 2014, and the entirety of which is incorporated by reference herein.

TECHNICAL FIELD

The application generally relates to image surveillance systems and related image processing methods thereof, and more precisely, to intuitive see-through surveillance systems and related image processing methods thereof capable of stitching multiple images using image stitching and blending technologies.

BACKGROUND

Surveillance systems are generally used for social security control, traffic management, and even entertainment and travel. In everyday life, despite the availability of surveillance cameras installed in places, such as parking lots and other spaces demanding surveillance, a single surveillance camera usually cannot cover the whole area. Therefore, as far as parking lots are concerned, several surveillance cameras need to be set up to ensure overall security. Monitoring personnel on the other hand often either fail to instantly detect or fail to detect special events that require immediate attention (such as robberies, faints, or other incidents requiring immediate disposal) due to the need to switch screens during monitoring. Situations such as these can be attributed to monitoring personnel's blind spots caused by fatigue. Additionally, when it comes to system operation, amateur monitoring personnel who view multiple sets of video images are usually unable to quickly understand the corresponding relevance between monitored screen contents and the monitored space, thus the inability to quickly locate the place in question.

Although the surveillance system currently available features image stitching involving overlapping of two images to complete dual image stitching and widen the viewing area, it fails to complete a wider range of field monitoring through one single screen. At present, a type of surveillance camera is even available to enable users to take high-resolution screenshots and have them displayed on a regular screen through a virtual PTZ (Pan/Tilt/Zoom) camera. This in turn makes small-scale monitoring of a large monitored area possible. Although this camera allows users to view monitoring details more clearly through one single screen, even if several PTZ cameras are set up in a monitored space, it cannot show the entire field with fewer images. Another technology is the use of a one-on-one camera that captures static images with a large viewing angle; one-on-two PTZ cameras can dynamically monitor specific areas, forming monitoring images with a larger visual range but lacking in clarity.

SUMMARY

Intuitive see-through surveillance systems and related image processing methods are provided. In accordance with the application an exemplary embodiment of an image processing method for use in a surveillance system is provided. The method comprises the steps of capturing a plurality of images from different sources, performing a corresponding point detection on the images to obtain a plurality of feature correspondences of the images, determining the space geometrical relations between the images according to the feature correspondences of the images, and blending and/or stitching the images to generate at least one composite image based on the space geometrical relations between the images.

In accordance with the application an exemplary embodiment of a surveillance system including a plurality of image capture units and a processing unit is provided. The image capture units are arranged for capturing a plurality of images from different sources. The processing unit is coupled to the image capture units and is arranged for obtaining the images through the image capture units, performing a corresponding point detection on the images to obtain a plurality of feature correspondences of the images, determining the space geometrical relations between the images according to the feature correspondences of the images, and blending and/or stitching the images to generate at least one composite image based on the space geometrical relations between the images.

Image processing methods may take the form of a program code embodied in a tangible media. When the program code is loaded into and executed by a machine, the machine becomes an apparatus for practicing the disclosed method.

BRIEF DESCRIPTION OF DRAWINGS

The application can be more fully understood by reading the subsequent detailed description and exemplary embodiments with references made to the accompanying drawings, wherein.

DETAILED DESCRIPTION OF THE EMBODIMENTS

This description is made for the purpose of illustrating the general principles of the application and exemplary embodiments will be described in detail with reference to accompanying drawings so as to be easily realized by a person having ordinary knowledge in the art. The inventive concept may be embodied in various forms without being limited to the exemplary embodiments set forth herein.

Embodiments of the application provide intuitive see-through image surveillance systems and related image processing methods thereof, which blend images captured by several cameras through image stitching and image alignment technology and utilize the common background feature points or objects viewed from the cameras to infer the space geometry or relative correlation between locations of the cameras in space, thereby achieving the goal of stitching and blending multiple images. The images generated aid users in viewing the entire field through a single screen, making it possible to monitor the entire monitored area through single image or screens fewer in number than the original plurality of images. Users will then be able to quickly understand the space geometry between the monitored screen and monitored area without having to switch cameras or move their eyes back and forth between the screens, thus achieving the effect of entire field monitoring through single screen displayed.

To be more specific, the image processing method of the application can utilize the background corresponding points or objects which are together viewed by several cameras to infer the space geometry between the cameras in order to complete the image stitching and blending of multiple images, thereby providing a composite image of the entire field for the monitoring personnel through a single screen. In particular, some of the images from the composite image were presented in translucent form in other images based on the space geometry between the images, while other images were stitched with the other images based on the space geometry.

Figure 1:
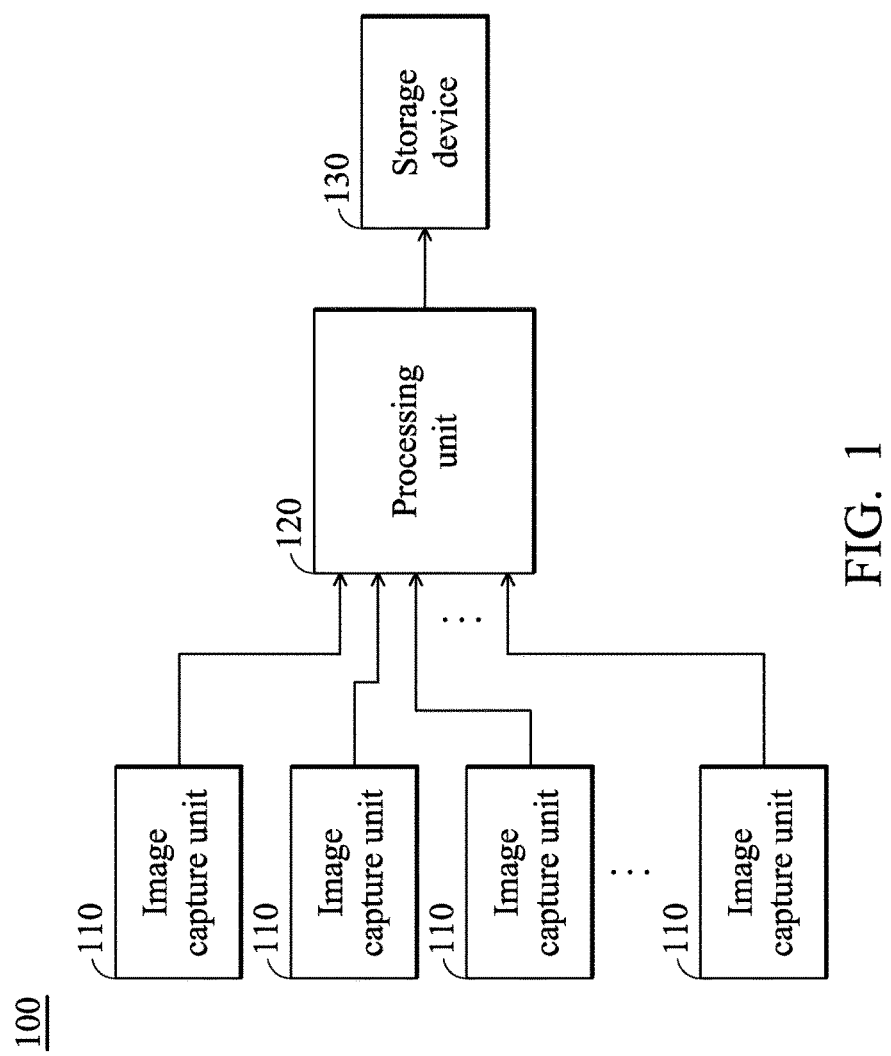
FIG. 1 is a schematic diagram illustrating an exemplary embodiment of a surveillance system according to the application.

FIG. 1 is a schematic diagram illustrating an exemplary embodiment of a surveillance system 100 according to the application. As shown in FIG. 1, the surveillance system 100 at least comprises multiple image capture units 110, a processing unit 120 and a storage device 130. The image capture units 110 (e.g. cameras) are used to capture/record monitoring images. In particular, each image capture unit 110 can be set up in a specific monitored area such as a parking lot or different locations of a building. Moreover, the monitoring image captured by each image capture unit 110 can be a partial image in the monitored area for providing monitoring management in the specific monitored area. For example, the image capture unit 110 can be one of an infrared image capture unit, an optical coupler and a complementary metal-oxide semiconductor (CMOS) optical sensing element or any combination thereof, and the invention is not limited thereto.

The processing unit 120 is coupled to all of the image capture units 110 and the storage unit 130 and may load and execute a series of instructions and/or program codes from the storage unit 130 for performing the image processing method of the application based on images captured by the image capture units 110, which will be discussed further in the following paragraphs. The processing unit 120 can be a general purpose processor, a Central Processing Unit (CPU), a Micro-Control Unit (MCU), image processor, Digital Signal Processor (DSP), or the like, which provides the function of data processing and computing. The storage unit 130 may be a non-volatile storage medium (e.g., Read-Only Memory (ROM), Flash memory, hard disk, or optical disc), or a volatile storage medium (e.g., Random Access Memory (RAM)), or any combination thereof for storing relevant data, such as intermediate data in the calculation process, resulting matrix data and so on.

To be more specific, according to specific algorithms and principles, the processing unit 120 can use background feature points or objects which are together viewed by a number of image capture unit 110 to infer the relative locations of the image capture units 110 and their space geometry and complete the stitching and blending of the plurality of images based thereon so as to provide the composite image of the entire field through a single screen for the monitoring personnel. In particular, some of the translucent images from the composite images appeared in other images in translucent form based on the space geometry, while some images were stitched with other images according to the space geometry. The space geometry of the images captured by the image capture units 110 can be divided into vertical paired geometry and lateral adjacent geometry. Two images with vertical paired geometry are also known as vertical paired images; two images with lateral adjacent geometry are also known as lateral paired images.

Figure 2:
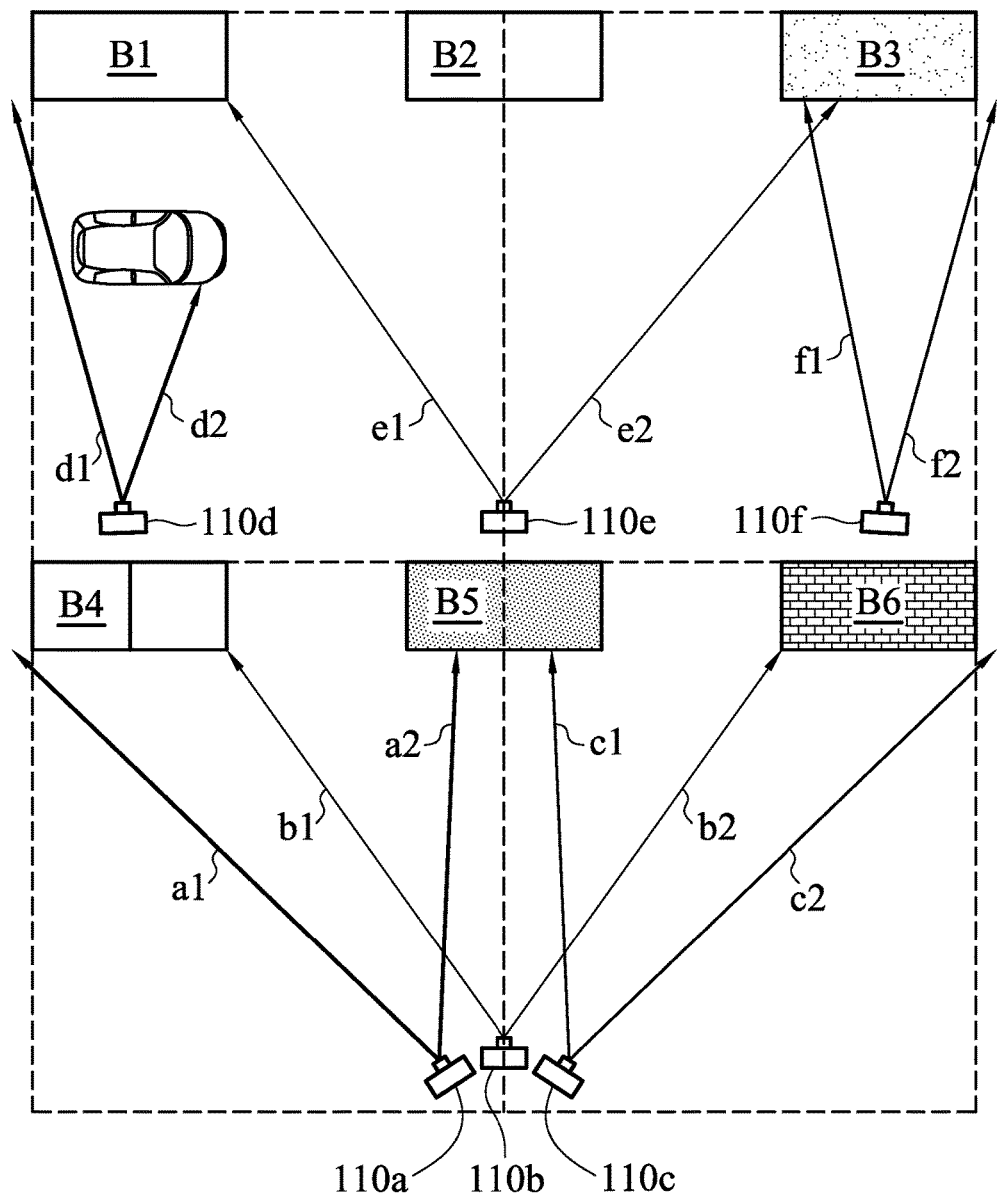
FIG. 2 is a schematic diagram illustrating an exemplary embodiment of a configuration structure of the image capture units of the surveillance system according to the application.
Figure 3:
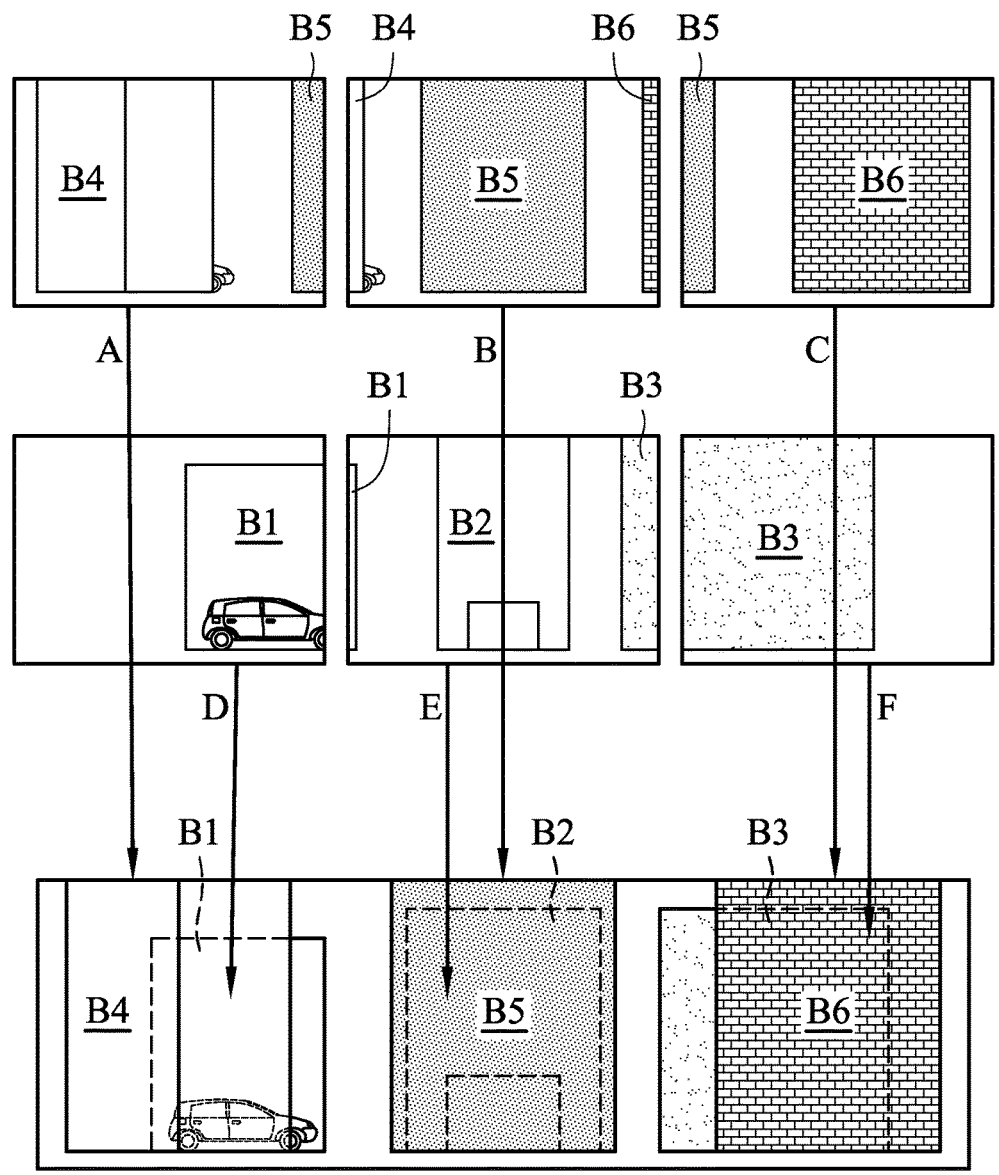
FIG. 3 is a schematic diagram illustrating an exemplary embodiment of images and results captured by the image capture units based on the configuration structure of FIG. 2 according to the application.

For example, in one embodiment of multiple one-way monitoring and the image capture units 110 being the cameras, as shown in FIG. 2, six cameras, namely, 110a, 110c, 110d, 110e, and 110f, were set up in appropriate locations of obstacles B1-B6 for providing monitoring images of the obstacles B1-B6. An object was placed at the back of B4 (such as a car, a specific target, or an object requiring monitoring). In particular, as shown in the FIG. 2, solid lines a1 and a2 were used to express the general viewing angle of camera 110b; solid lines c1 and c2 were used to express the general viewing angle of camera 110c. Similarly, solid lines d1 and d2, e1 and e2, and f1 and f2 were used to express the general viewing angles of cameras 110d, 110e and 110f, respectively. In this embodiment, the shooing contents of the lateral adjacent cameras 110a, 110b, and 110c had overlapping areas. The vertical cameras 110d, 110e, and 110f closer to the background were positioned at the back of obstacles in front of the vertical cameras 110a, 110b, and 110c, which were farther away from the background. In addition, the background shot from the front and rear cameras are the same, such as the contents shot from the cameras 110a, 110b, 110c, 110d, 110e, and 110f are images A, B, C, D, E, and F, respectively, as shown in FIG. 3. For example, in FIG. 3, the image A was the content shot from the front camera 110A located in front of the obstacle B4, which includes complete images of the obstacle B4, partial images of the obstacle B5, and partial images of the object behind B4; the image B is the content shot from camera 110b in front of the obstacle B5, which includes partial images of the obstacle B4, complete images of the obstacle B5, and partial images of the object behind the obstacle B4; the image C is the content shot from camera 110C in front of the obstacle B6, which includes partial images of the obstacle B5 and complete images of the obstacle B6. Similarly, the image D is the content shot from camera 110d at the back of the obstacle B4, which includes partial images of the obstacle B1 and most images of the object; the image E is the content shot from the camera 110e at the back of the obstacle B5, which includes partial images of the obstacles B1 and B3 and complete images of the obstacle B2. The image F is the content shot from the camera 110e behind the obstacle B6, which includes most or all the images of the obstacle B3. It should be understood that the above-mentioned quantity of obstacles, cameras, and relevant setup locations and image contents were used only in the explanation, and the invention is not limited thereto. In this example, the content shot from the lateral adjacent cameras 110*a* and 110*b* had overlapping areas; the front and rear vertical cameras 110*a* and 110*d* can shot the same background. The corresponding image A and image B of the lateral adjacent cameras 110*a* and 110*b* could be lateral paired images due to the lateral adjacent geometry therebetween; the image A and D corresponding to the front and rear vertical cameras 110*a* and 110*d* could be vertical paired images due to the front and rear vertical geometrical relationship. The processing unit 120 may infer the transformation matrix for stitching two images based on the common viewing background between images of the plurality of lateral cameras. Additionally, based on the background viewed from the plurality of front and rear vertical cameras, the processing unit 120 may also infer the transformation matrix among the vertical front and rear images. Finally, images of the lateral cameras are stitched with each other using their corresponding transformation matrix and thus wider images in the lateral space were formed. Furthermore, the vertical front images and the lateral stitching images were fused using the transformation matrix corresponding to the vertical front images to present the translucent obstacle shot from the front camera corresponding to the lateral stitched images (as shown in FIG. 3, the translucent images are expressed as dotted lines).

In the embodiment, the image analysis algorithm is utilized to infer the relationship between pixels shot from the plurality of cameras. As shown in FIG. 2, under the condition that the lateral camera and vertical camera had overlapping shooting contents and through the common viewing background between the images, the plurality of lateral and vertical cameras inferred the transformation matrix between images. Subsequently, all the images were fused to become a single image. This single image had a wider viewing angle than any of the plurality of images, and some pixels were translucent (such as the images in dotted lines shown in FIG. 3). Hence, the composite image of the original plurality of images could be viewed through a single image as shown in FIG. 3.

In some embodiments, the specific processes involved in the generation of composite images using processing unit 120 at least include the following steps: (1) the detection of corresponding points between images captured by each image capture unit 110; (2) the estimation of fundamental matrices between images; (3) the use of fundamental matrices and Random Sample Consensus (RANSAC) algorithm to filter out erroneous outliers; (4) the estimation of multiple homography matrices of images and reference images; (5) the execution of space geometric conversion on the plurality of images based on the matrices obtained; and (6) the stitching and fusion of converted plurality of images and reference images for the generation of composite images. The specific processes will be detailed in the following paragraphs. For easy illustration, the image capture unit 110 is to be the camera. However, it is understood that the invention is not limited thereto.

Figure 4:
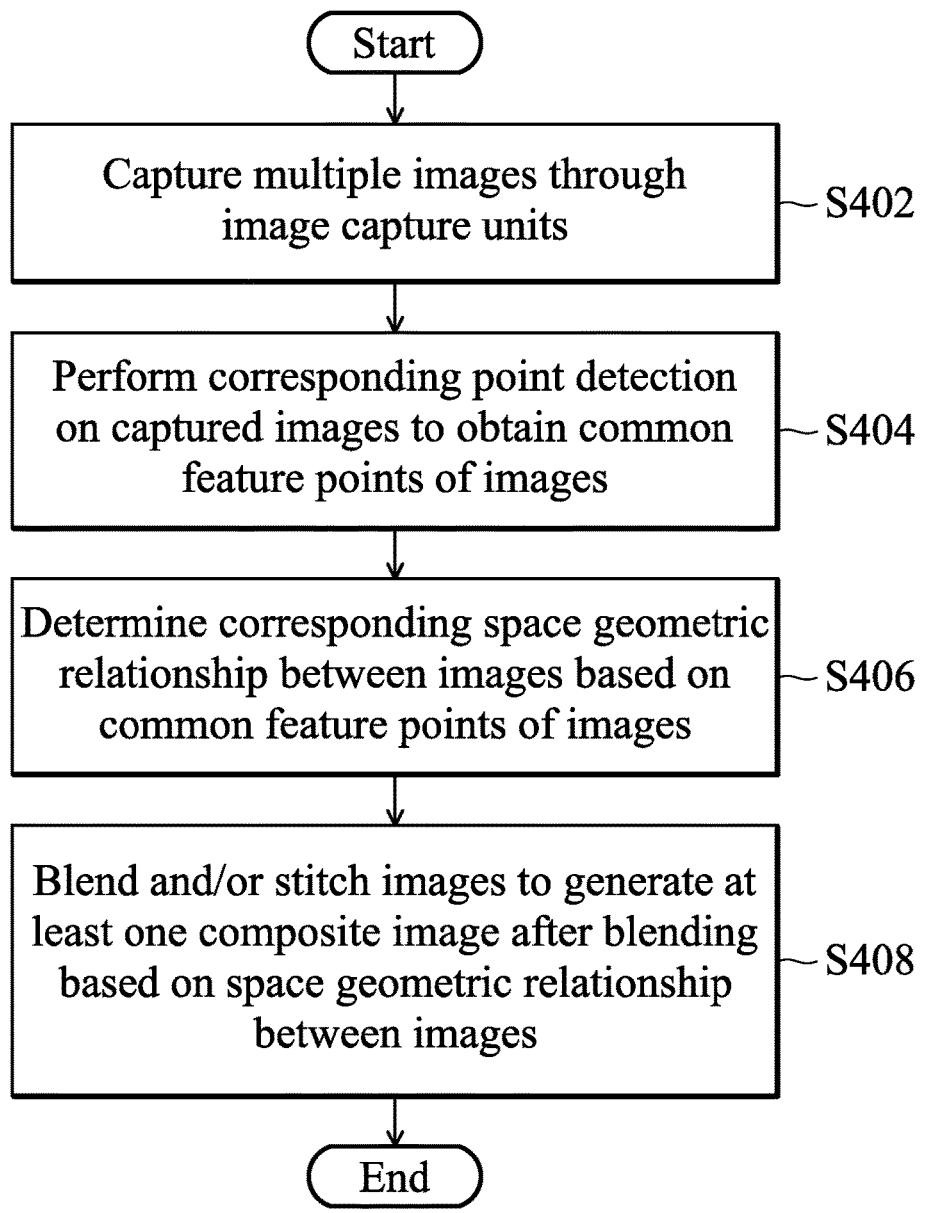
FIG. 4 is a flow chart illustrating an image processing method according to an exemplary embodiment of the application.

FIG. 4 is a flowchart of an embodiment of an image processing method of the application. Please refer to FIGS. 1 and 4. The image processing method can be applied to a surveillance system such as the surveillance system 100 as shown in FIG. 1 and it can be performed by the processing unit 120 of the surveillance system 100.

First, in step S402, the processing unit 120 captures multiple images from different sources through the image capture units 110, and then in step S404, it performs a corresponding point detection on the captured images to obtain feature correspondences of the images.

Figure 9:
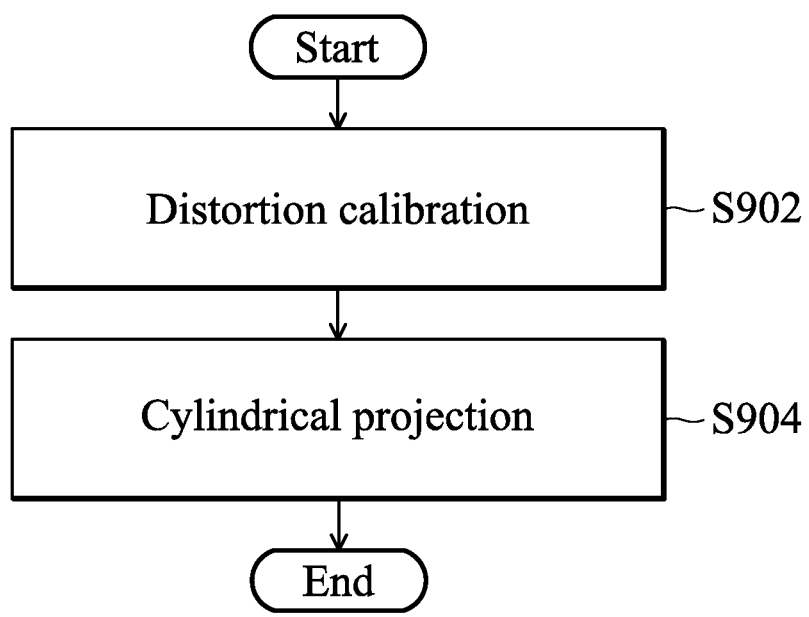
FIG. 9 is a flowchart of an embodiment of the image pre-processing operation of the application.

In some embodiments, prior to the detection of corresponding points on the images, an image pre-processing operation may be selectively performed as needed for the images. Detail operation of the image pre-processing operation can be referred with FIG. 9. FIG. 9 is a flowchart of an embodiment of the image pre-processing operation of the application, which can be performed by the processing unit 120. The image pre-processing operation includes performing a distortion calibration (step S902) and a cylindrical projection (step S904) for each image to obtain a projected image which has been calibrated. The detection of corresponding points on the projected image is then done to obtain the feature correspondences of the images. It should be understood that although the aforementioned image pre-processing operation includes the distortion calibration and cylindrical projection for the images, but the invention is not limited thereto. In other words, in some embodiments, image pre-processing, such as distortion calibration or cylindrical projection for the image, can be selectively done based on demand to obtain a better image.

Figure 5A:
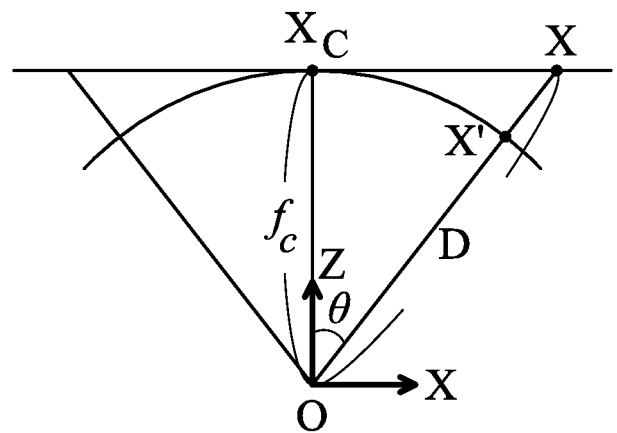
FIGS. 5A and 5B are schematic diagrams illustrating an exemplary embodiment of cylindrical projection according to the application.
Figure 5B:
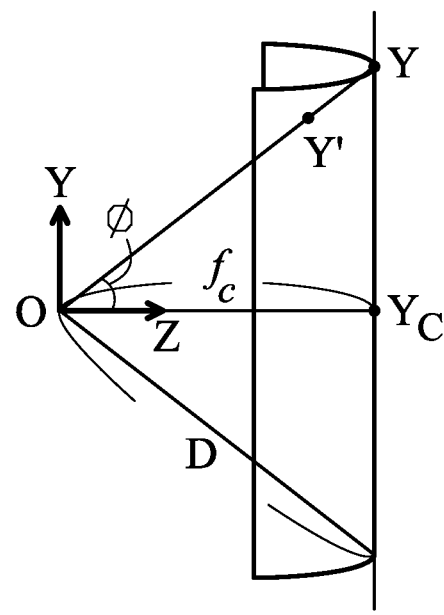

For example, when the image capture unit 110 is a fisheye camera, the image captured will be a distorted image. Distortion calibration must be applied first. Subsequently, in the image stitching of the lateral camera, the image is first projected onto the cylinder to help make the stitching effect more natural, as shown in FIG. 5A and FIG. 5B. Therefore, the new location of the pixels originally located at (x, y) after the projection is $$(x',y')=(f_c \sin \theta, f_c \tan \phi) \quad (1)$$

wherein, $$\theta=\tan^{-1}(x-x_c/f_c), \phi=\tan^{-1}(y-y_c/D)$$

$\theta$ is the angle between $f_c$ and $\overline{ox}_c$ on XZ-plane; $\phi$ is the angle between D and $\overline{oy}$ on the YZ-plane; and the distance from o to the original pixels is $D=\sqrt{f_c^2+(x-x_c)^2}$.

After the feature correspondences of the images are obtained, in step S406, the processing unit 120 determines the corresponding space geometric relationship between the images. The space geometric relationship between images captured by each image capture unit 110 can be divided into longitudinally paired and laterally adjacent geometric relationships. The two images having a longitudinally paired geometric relationship are also known as longitudinal paired images, and the two images having laterally adjacent geometric relationship are also known as laterally adjacent images or laterally paired images. Refer to FIG. 2 and FIG. 3 for examples. As previously described, the shooting contents of the laterally adjacent cameras 110*a* and 110*b* have a mutually overlapping region, and the longitudinal paired cameras 110*a* and 110*d* can capture the common background. Image A and image B that correspond to the laterally adjacent cameras 110*a* and 110*b*, respectively, are the laterally paired images due to the laterally adjacent geometric relationship, and image A and image B are the adjacent images to each other. Due to the front and rear longitudinal geometric relationship, image A and image D corresponding to the front and rear longitudinal cameras 110*a* and 110*d*, respectively, are the longitudinal paired images in which the image A is the front image, and the image D is the rear image.

Figure 10:
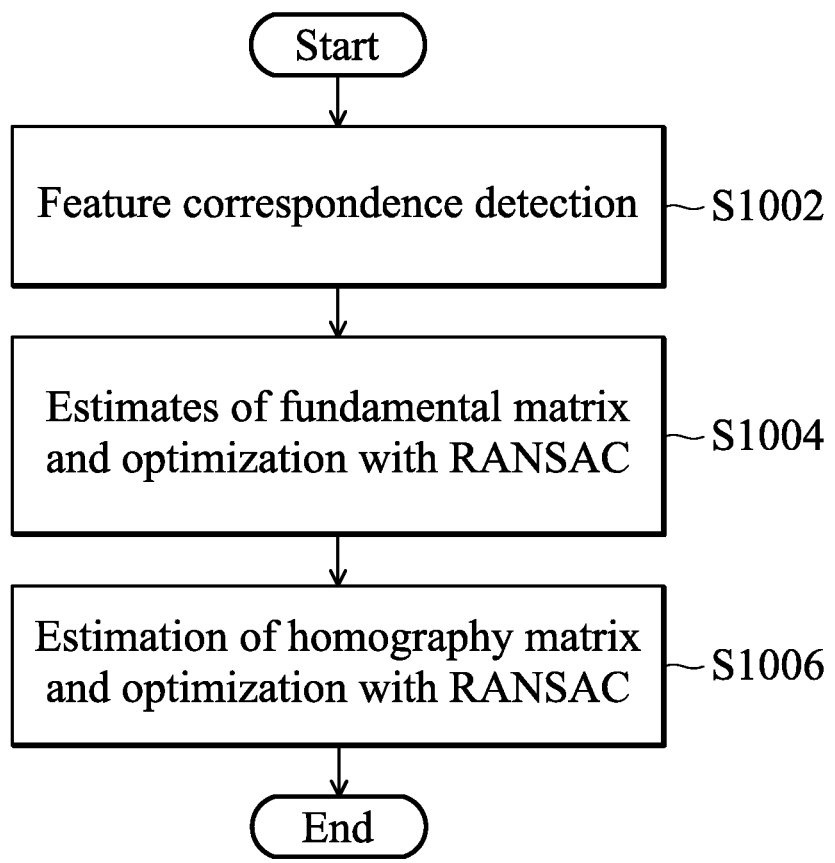
FIG. 10 is a flowchart of an embodiment of an algorithm for calculating the space geometric relationship between each image of the application.

The estimation of the space geometric relationship between each image must first use the feature correspondences. Detail calculation of the space geometric relationship between each image can be referred with FIG. 10. FIG. 10 is a flowchart of an embodiment an algorithm for calculating the space geometric relationship between each image of the application, which can be performed by the processing unit 120.

First, in step S1002, the processing unit 120 uses a feature correspondence detection algorithm, such as the Scale-Invariant Feature Transform (SIFT) algorithm, the Speeded Up Robust Features (SURF) algorithm, or any other algorithm that can obtain corresponding points between two images, to obtain feature points of each image in the plural images captured by the lateral cameras and vertical cameras. The matching of feature points is done on the front and rear images of the laterally adjacent images and longitudinally paired images to find the corresponding points (Correspondences) of the images. Then, in step S1004, the processing unit 120 estimates and optimizes the relationship between the two images. Since the corresponding points are known, the relationship between the two images can be mutually described by a rotation matrix and a translation matrix. In one embodiment, based on the feature correspondences of the images, the space geometric relationship between two images is determined and may include the following steps: Based on the feature correspondences of images, at least one translation matrix and at least one rotation matrix that correspond to any two (or each pair) of these images are calculated, and based on the calculated translation matrix and rotation matrix, the space geometric relationship between the images is determined. For example, assume that the coordinates of the same corresponding point in the front image are $p=[x, y, 1]^t$, and the coordinates of the same corresponding point in the rear image are $p'=[x', y', 1]^t$; or the coordinate in the left image is p, and the coordinate in the right image is p'. In the two scenarios above, the relationships between p and p' are all $p'^t Fp=0$, wherein the fundamental matrix F can be used to describe the relationship between each pair of corresponding points. To solve the fundamental matrix F, conventional algorithms such as the calibrated five-point algorithm, whose details may refer to the following paper: "D. Nister, An Efficient Solution to the Five-Point Relative Pose Problem. IEEE Trans. Pattern Analy. Machine Intell., pages 756-770, 2004.", or the normalized Eight point Algorithm, which details may refer to the following paper "R. I. Hartley. In Defense of the Eight-Point Algorithm. IEEE Trans. Pattern Analy. Machine Intell., 19, 1997.", may be used. After the fundamental matrix F is solved, in the case of the Instrinsic Matrix of the camera being known, the mutually correlated rotation matrix and translation matrix between the pixels on the two screens can be obtained.

However, the above two algorithms represent a minimum requirement of five sets of corresponding points or eight sets of corresponding points that can solve F, but in practical applications, noise interference occurs most likely because the randomly selected five sets of points or eight sets of points are outliers. Thus, in some embodiments, in order to improve the accuracy and robustness of the F estimation, an optimal algorithm was further used, such as RANSAC, to find a more appropriate F based on the statistical point of view. The method of its operation is as follows: assuming that there are corresponding points of five sets or eight sets in repeated random selection, the corresponding points in at least one selection are not polluted by noise. Therefore, the repeated selection of five set or eight sets of points can find F with the smallest residual, $|p'^t Fp|$. By iteratively applying the above-mentioned procedures. The feature correspondences could be therefore divided into inliers and outliers, while those corresponding points considered to be the inliers can be used in the estimation of the transformation matrix later.

On the other hand, in the longitudinal front and rear cameras (e.g., the cameras 110e and 110b of FIG. 2), the epipole (that is, the intersection of two imaging optical axis centers and plane of projection) of the longitudinal front and rear images (for example, images E and B in FIG. 3) captured by the longitudinal front and rear cameras is an important basis for determining whether the estimation of F is correct. If the longitudinal and rear images have a commonly viewing background, and the front image is located behind the obstacle at the rear image, in theory, the position of the epipole of the rear image must be reasonable. Otherwise, it means this estimation of F is poor. Specifically, the so-called reasonable representative epipole must be located at where the front camera is in the rear images. If this epipole is located on the background commonly viewed in the front and rear images, the result of this estimation of F is obviously wrong.

In theory, the pixels extracted by blending longitudinal paired images are pixels adjacent to the front and rear epipole, while the epipole e' of the rear image is the left null vector of F, and the epipole e of the front image is the right null vector of F. The singular value decomposition (SVD) is used to solve F so as to obtain e' and e.

Thereafter, in step S1006 of FIG. 10, the processing unit 120 performs the estimation of the homography matrix and optimization with RANSAC. In this embodiment, the estimation of the homography matrix estimation is divided into dealing with the lateral images and longitudinal images. In the stitching of lateral images, each pair of laterally adjacent images must rely on space geometric conversion to link the overlapping portion of the paired image pixels. In this embodiment, the homography matrix was used to model the relationship between pixels of the paired image. A pixel in (x, y) is expressed in homogeneous coordinates as $x=[x, y, 1]^t$, and if the position after conversion is (x', y'), it is also expressed by homogeneous coordinates $x'=[x', y', 1]^t$. Then, the coordinates before and after the conversion can be expressed as $$x'=Hx,$$

wherein, H is a 3×3 matrix. To estimate the nine elements in this matrix at least four sets of corresponding points must be given. After this equation has been rearranged, it becomes a homogeneous system of linear equations. The type is $$Ah=0,$$

wherein, the dimension of A is 8×9, and h as 9×1 refers to the 9 elements in H. Through the above SVD to decompose A, we can get $A=UDV^t$, in which, the solution is the column vector in V corresponding to the smallest singular value of D. This solution is called direct linear transformation (DLT).

Next, the estimation of this homography matrix uses RANSAC to resolve the best solution. In one embodiment, the estimation of the homography matrix uses RANSAC to obtain the best solution may comprise the following steps: repeatedly random selection of four set points is used to solve h, and the accumulated errors are calculated by substituting all points except the four set points into |x'−Hx| which is the residual error, and finally, the H corresponding to the minimum error is the best H based on the statistical point of view.

Referring back to FIG. 4, after the corresponding space geometric relationship between the images is determined, in step S408, the processing unit 120 blends and/or stitches the images to generate at least one composite image after the blending based on the space geometric relationship between the images. The blending of images is also divided into longitudinal and latitudinal. In order to make the blending of all pixels in the overlapping part of the two latitudinal images natural, the weight of the blending must be set subject to the distance of the pixels in the overlapping part from the non-overlapping area, in order to make the results more natural. For example, in one embodiment, blending and/or stitching the images to generate at least one composite image after the blending based on the space geometric relationship between the images may include the following steps: based on the location of the space geometric relationship between images, at least one longitudinally paired image of the front and rear images can be obtained and a specific obstacle in the images of the translucent stitched longitudinally paired images to generate composite image. In one embodiment, for example, blending and/or stitching the images to generate at least one composite image after the blending based on the space geometric relationship between the images may include the following steps: based on the space geometric relationship between the images, each pair of laterally adjacent images can be obtained and stitching is performed on the images of each pair of laterally adjacent images to generate the composite image.

Figure 6:
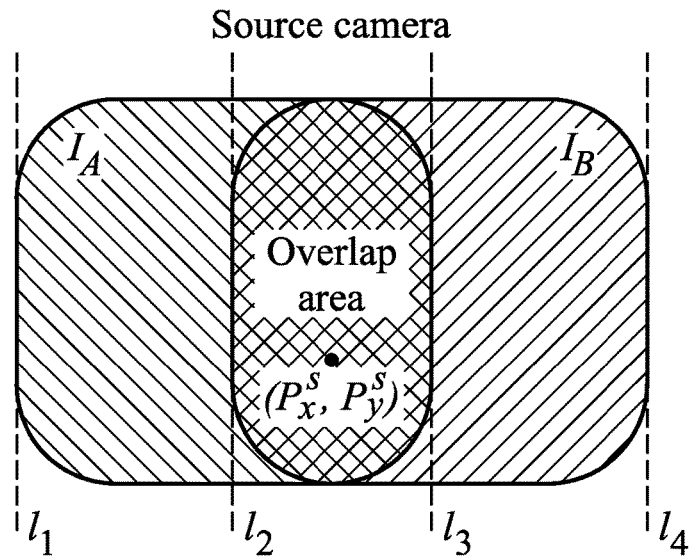
FIG. 6 is a schematic diagram illustrating an embodiment of an image stitching of the application.
Figure 7:
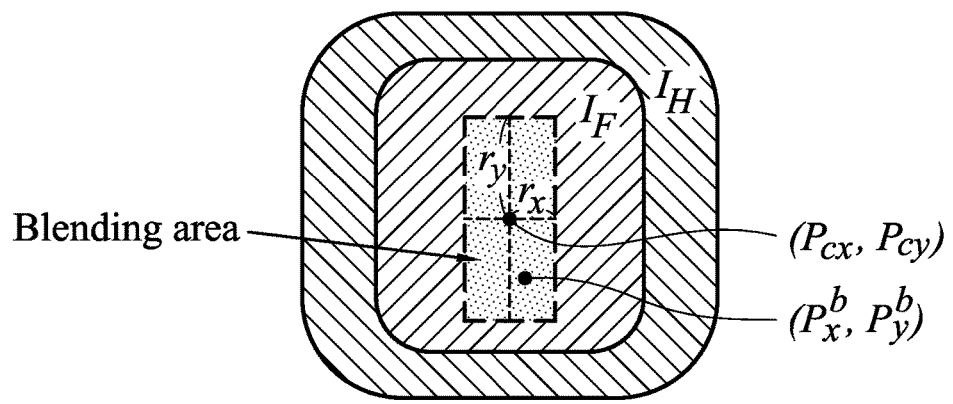
FIG. 7 is a schematic diagram illustrating an embodiment of an image blending of the application.

FIG. 6 is a schematic diagram illustrating an embodiment of an image stitching of the application. As shown in FIG. 6, it is assumed that $l_2$ is the boundary of the right image ($I_B$) in the left image ($I_A$), $l_3$ is the right boundary of the left image overlay on the right image. If the pixels are interposed between $l_2$ and $l_3$, then the mixed images Is may be expressed as $$I_s = (1-\alpha)I_A + \alpha I_B,$$

wherein, $$\alpha = p_x^2 - l_2/l_3 - l_2,$$

where the relationship of the longitudinal front and rear images also use the homography matrix to describe it, but the aim of the image blending is translucent. Therefore, the differences with the lateral image stitching are that the overlapping pixels of two completely transformed images are not the pixels to describe the same obstacles, as shown in FIG. 7. FIG. 7 is a schematic diagram illustrating an embodiment of an image blending of the application. As shown in FIG. 7, the closer the pixels are to the center of the overlapping area, the higher the weighting of the front image ($I_F$) that is further away from the camera. The closer the pixels are to the boundary of the overlapping area, the higher the weighting of the rear image ($I_H$) that is closer to the camera. The pixels in the middle are between the two, namely:

$$I_B = \beta I_H + (1-\beta)I_F,$$

wherein, $\beta$ is the blending weighting.

However, it is to be noted that this is one embodiment of blending images. The degree of transparency between the two images can be transparent or translucent, or vary between transparent and translucent, and the degree of transparency can be associated with the position of the pixel or have no relevance.

Then, the resulting image matrix can be generated to record the relevant information of stitching and blending of those pixels in the images captured by the cameras for each pixel of images generated by final stitched and blended image and stored in the storage device 130. After that, when the image capture unit 100 is used online, the resulting image matrix can be obtained from the storage device 130 and the composite image can be generated based on stitching and blending relevant information of the image matrix.

Figure 8:
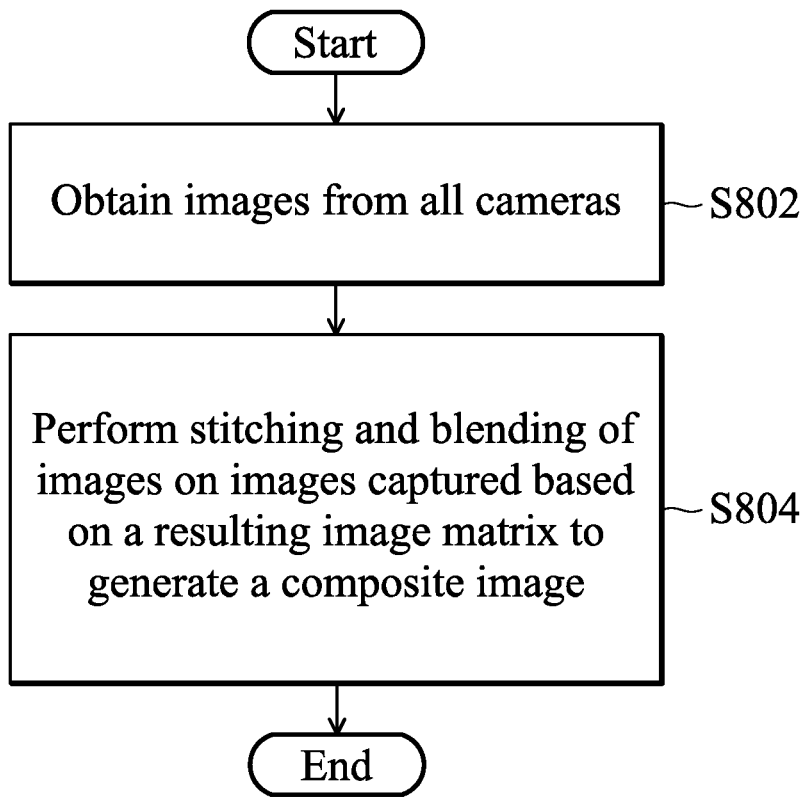
FIG. 8 is a flowchart of another embodiment of an image processing method of the application.

FIG. 8 is a flowchart of another embodiment of an image processing method of the application. Please refer to FIGS. 1 and 8. The image processing method can be applied to the surveillance system 100 as shown in FIG. 1 and it can be performed by the processing unit 120 of the surveillance system 100.

First, in step S802, the processing unit 120 obtains plural images from different sources through the cameras 110, and in step S804, obtains the resulting image matrix generated by the aforesaid offline operation from the storage device 130 to perform the stitching and blending of images on the plural images captured based on the stitching and blending of relevant information of the resulting image matrix to generate a composite image, so as to achieve the effectiveness of the system.

In some embodiments, the image capture unit 110 may further use wired network such as the Ethernet network as the information transmission medium or it can use WiFi, WiMAX, LTE or any transmission device capable of transmitting the images captured by the image capture unit 110.

In some embodiments, all images were fused to generate direct-view composite monitoring images of perspective images, which can be displayed for user viewing on devices such as computer screens, displays, or smartphones. In addition, the embodiments of the application can be installed on any devices with computing capabilities, which can be an embedded system, such as smartphones, car computers and so on, and the computing core can be single-core or multiple cores and can perform one or more types of program instructions.

In some embodiments, in practical applications, overlapping areas shot from dissimilar cameras may require manual calibration tools due to a lack of texture information. These tools may be calibration plates or known three-dimensional calibration tools. The pattern on a calibration plate may be a checkerboard or a known pattern that provides at least four feature points to facilitate automatic detection through the computer vision algorithm. In some embodiments, under the condition that a vertical camera's vertical distance is too far away so that automatic calibration pattern recognition becomes difficult, manual allocation of four feature points in two images on the calibration screen may be feasible.

In some embodiments, when preset field model data of a specific area is stored in the storage device 130 (that is, a parking lot data or the 3D model of a building), the image processing method of the application may also be applied in situations where all or parts of the images shot from the plurality of cameras do not have an overlapping area. The preset field model can be used as the background basis image, and the images captured by all the cameras can be fused in appropriate locations into the field model. The field model may be 2D, 3D, or in any form that allows users to see through the monitored area of the plurality of cameras, thereby further providing 3D simulation or monitoring.

Therefore, according to the surveillance system and related image processing methods of the application, the images captured by multiple cameras can be fused, so that the monitoring personnel had no need to switch back and forth among the images, thus preventing hazardous events and delayed reactions due to blind spots caused by visual fatigue of monitoring personnel. Furthermore, the surveillance system and related image processing methods of the application can make that some obstacles in the ubiquitous images became translucent through image blending such that the monitoring personnel can quickly understand the space geometry between specific locations and images within the field without requiring prior knowledge or training, thus achieving the goal for effective monitoring.

Methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the application has been described by exemplary embodiments, it is to be understood that the application is not limited thereto. It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An image processing method for use in a surveillance system, comprising:
    capturing a plurality of images from different sources;
    performing a corresponding point detection on the images to obtain a plurality of feature correspondences of the images;
    determining a plurality of space geometrical relations between the images according to the feature correspondences of the images; and
    blending and/or stitching the images to generate at least one composite image based on the space geometrical relations between the images;
    wherein blending and/or stitching the images to generate the composite image based on the space geometrical relations between the images further comprises:
        obtaining at least one pair of longitudinally paired images including a front image and a rear image based on the space geometric relationship between the images; and
        translucentizing a specific obstacle in the images of the longitudinally paired images to generate the composite image; and
    wherein obtaining the plurality of feature correspondences of the images further comprises:
        using a Scale-Invariant Feature Transform (SIFT) algorithm or a Speeded Up Robust Features (SURF) algorithm to obtain corresponding points for the longitudinally paired images; and
        using an optimal algorithm to constantly solve a fundamental matrix to filter out erroneous outliers from the feature correspondences of the longitudinally paired images;
    wherein the step of translucentizing the specific obstacle in the images of the longitudinally paired images to generate the composite image further comprises:
        using the optimal algorithm to constantly solve a homography matrix describing relationship between pixels of the longitudinally paired images; and
        blending the longitudinally paired images by the homography matrix to generate the composite image; and
    wherein in generation of the composite image, the pixels closer to the center of an overlapping area use pixels of the front image of the longitudinally paired images and the pixels closer to the boundary of the overlapping area use pixels of the rear image of the longitudinally paired images.

2. The image processing method of claim 1, wherein a portion of the images are translucent blended with other images and the other images are stitched with each other according to the space geometrical relations between the images.

3. The image processing method of claim 1, wherein performing the corresponding point detection on the images to obtain the feature correspondences of the images further comprises:
    prior to performing the corresponding point detection on the images, performing an image pre-processing operation on the images,
    wherein the image pre-processing operation further comprises selectively performing a distortion calibration and/or a cylindrical projection on each of the images to obtain a better image and performing the corresponding point detection on the better images obtained to obtain the feature correspondences of the images.

4. The image processing method of claim 1, wherein determining the space geometrical relations between the images according to the feature correspondences of the images further comprises:
    calculating at least one translation matrix and at least one rotation matrix that correspond to each pair of the images based on the feature correspondences of images; and
    determining the space geometric relationship between the images based on the translation matrices and rotation matrices calculated.

5. The image processing method of claim 1, wherein the degree of blending of the longitudinally paired images is transparent, translucent, or between transparent and translucent.

6. An image processing method for use in a surveillance system, comprising:
    capturing a plurality of images from different sources;
    performing a corresponding point detection on the images to obtain a plurality of feature correspondences of the images;
    determining a plurality of space geometrical relations between the images according to the feature correspondences of the images; and
    blending and/or stitching the images to generate at least one composite image based on the space geometrical relations between the images;
    wherein blending and/or stitching the images to generate the composite image based on the space geometrical relations between the images further comprises:
        obtaining a plurality of pairs of laterally adjacent images based on the space geometric relationship between the images; and
        stitching the images of each pair of laterally adjacent images to generate the composite image; and
    wherein obtaining the plurality of feature correspondences of the images further comprises:

using a Scale-Invariant Feature Transform (SIFT) algorithm or a Speeded Up Robust Features (SURF) algorithm to obtain corresponding points for each pair of laterally adjacent images; and using an optimal algorithm to constantly solve a fundamental matrix to filter out erroneous outliers from the feature correspondences of each pair of laterally adjacent images;

wherein the step of stitching the images of each pair of laterally adjacent images to generate the composite image further comprises:

using the optimal algorithm to constantly solve a homography matrix describing relationship between pixels of each pair of laterally adjacent images; and stitching the images with the corresponding laterally adjacent images by the homography matrix to generate the composite image, wherein a weight of the blending for pixels in an overlapping area of each pair of laterally adjacent images is determined based on a distance of the pixels and the boundary of two adjacent images in each pair of laterally adjacent images and the stitching of the images is performed based on the weight of the blending.

7. A surveillance system, comprising:

a plurality of image capture units, capturing a plurality of images from different sources; and a processing unit coupled to the image capture units, obtaining the images through the image capture units, performing a corresponding point detection on the images to obtain a plurality of feature correspondences of the images, determining a plurality of space geometrical relations between the images according to the feature correspondences of the images, and blending and/or stitching the images to generate at least one composite image based on the space geometrical relations between the images, wherein the processing unit further obtains at least one pair of longitudinally paired images including a front image and a rear image based on the space geometric relationship between the images, and translucentizes a specific obstacle in the images of the longitudinally paired images to generate the composite image, and wherein the processing unit further uses a Scale-Invariant Feature Transform (SIFT) algorithm or a Speeded Up Robust Features (SURF) algorithm to obtain corresponding points for the longitudinally paired images, uses an optimal algorithm to constantly solve a fundamental matrix to filter out erroneous outliers in the feature correspondences of the longitudinally paired images, uses the optimal algorithm to constantly solve a homography matrix describing relationship between pixels of the longitudinally paired images, and blends the longitudinally paired images by the homography matrix to generate the composite image, wherein in generation of the composite image, the pixels closer to the center of an overlapping area use pixels of the front image of the longitudinally paired images and the pixels closer to the boundary of the overlapping area use pixels of the rear image of the longitudinally paired images.

8. The surveillance system of claim 7, wherein the image capture units are one of infrared image capture units, optical couplers and complementary metal-oxide semiconductor (CMOS) optical sensing elements or any combination thereof.

9. The surveillance system of claim 7, wherein prior to performing the corresponding point detection on the images, the processing unit further performs an image pre-processing operation on the images, wherein the image pre-processing operation further comprises selectively performing a distortion calibration and/or a cylindrical projection on each of the images to obtain a better image and performing the feature correspondences detection based on the better images obtained.

10. The surveillance system of claim 7, wherein the processing unit further calculates at least one translation matrix and at least one rotation matrix that correspond to each pair of the images based on the feature correspondences of images and determines the space geometric relationship between the images based on the translation matrices and rotation matrices calculated.

11. The surveillance system of claim 7, wherein the degree of blending of the longitudinally paired images is transparent, translucent, or between transparent and translucent.

12. The surveillance system of claim 7, wherein the processing unit further obtains a plurality of pairs of laterally adjacent images based on the space geometric relationship between the images and stitches the images of each pair of laterally adjacent images to generate the composite image.

* * * * *